(12) United States Patent
Quioc

(10) Patent No.: US 9,550,471 B1
(45) Date of Patent: Jan. 24, 2017

(54) GAS GENERATING SYSTEM MOVABLE DIVIDER

(71) Applicant: TK Holdings Inc., Armada, MI (US)

(72) Inventor: Eduardo L. Quioc, Westland, MI (US)

(73) Assignee: TK Holdings Inc., Auburn Hills, MI (US)

( * ) Notice: Subject to any disclaimer, the term of this patent is extended or adjusted under 35 U.S.C. 154(b) by 221 days.

(21) Appl. No.: 14/319,547

(22) Filed: Jun. 30, 2014

Related U.S. Application Data

(60) Provisional application No. 61/841,418, filed on Jun. 30, 2013.

(51) Int. Cl.
| | |
|---|---|
| *B60R 21/263* | (2011.01) |
| *C06D 5/00* | (2006.01) |
| *B60R 21/02* | (2006.01) |
| *B60R 21/264* | (2006.01) |
| *B60R 21/26* | (2011.01) |

(52) U.S. Cl.
CPC ............. *B60R 21/263* (2013.01); *B60R 21/02* (2013.01); *C06D 5/00* (2013.01); *B60R 2021/26011* (2013.01); *B60R 2021/2642* (2013.01); *B60R 2021/2648* (2013.01)

(58) Field of Classification Search
CPC ........... B60R 21/26; B60R 2021/26011; B60R 21/263; B60R 2021/2633; B60R 2021/2642; B60R 2021/2648
See application file for complete search history.

(56) References Cited

U.S. PATENT DOCUMENTS

| | | | | |
|---|---|---|---|---|
| 5,803,494 A | * | 9/1998 | Headley | B60R 21/264 280/736 |
| 6,364,353 B2 | * | 4/2002 | Green, Jr. | B60R 21/2644 280/736 |
| 6,543,805 B2 | * | 4/2003 | McFarland | B60R 21/2644 102/531 |
| 6,701,849 B2 | * | 3/2004 | McFarland | B60R 21/2644 102/530 |
| 7,044,502 B2 | * | 5/2006 | Trevillyan | B60R 21/2644 280/736 |
| 7,726,687 B2 | | 6/2010 | Hoffman et al. | |
| 7,950,693 B2 | * | 5/2011 | Jackson | B60R 21/263 102/530 |

(Continued)

FOREIGN PATENT DOCUMENTS

| | | |
|---|---|---|
| WO | 2014/031437 | 2/2014 |
| WO | 2014/085052 | 6/2014 |

*Primary Examiner* — Paul N Dickson
*Assistant Examiner* — Timothy Wilhelm
(74) *Attorney, Agent, or Firm* — Meunier Carlin & Curfman LLC

(57) ABSTRACT

A gas generator is provided that contains a housing containing a base and a cap fixed to the base; a divider separating the housing into a first combustion chamber and a second combustion chamber, wherein the divider prevents sympathetic actuation of the second combustion chamber when the first combustion chamber is actuated; and an inner wall within the housing, the divider slidably engaged with the inner wall upon actuation of the first and second combustion chambers. Accordingly, a valve assembly of the present invention generally contains a movable divider that substantially seals an enclosure thereby defining a secondary combustion chamber within the gas generator.

20 Claims, 4 Drawing Sheets

(56) References Cited

U.S. PATENT DOCUMENTS

| | | | | |
|---|---|---|---|---|
| 8,011,303 B2 * | 9/2011 | Nakayasu | ............ | B60R 21/2644 102/530 |
| 8,444,179 B2 * | 5/2013 | McFarland | ......... | B60R 21/2644 102/530 |
| 8,556,294 B1 * | 10/2013 | Norman, III | .......... | B60R 21/263 102/531 |
| 2014/0144340 A1 | 5/2014 | Smith et al. | | |

* cited by examiner

GAS GENERATING SYSTEM MOVABLE DIVIDER

CROSS-REFERENCE TO RELATED APPLICATIONS

This application claims the benefit of Provisional U.S. Application Ser. No. 61/841,418 having a filing date of Jun. 30, 2013.

BACKGROUND OF THE INVENTION

The present invention relates generally to systems for generating gases for gas-actuatable devices. Dual stage inflators have been developed to provide staged gas production, whereby a first stage is actuated to deliver a predetermined amount of gas. If necessary, or if desired, a second stage is concurrently or subsequently actuated to deliver additional amounts of gas depending on the severity of an associated crash event, or depending on the position of the occupant, for example. As such, dual stage inflators typically contain two different combustion chambers that respond to a computer algorithm or other stimulus that directs one of several options for the dual stage inflator. For instance, the single stage or single chamber actuation of the dual stage inflator (in situations not requiring both stages) may be selected. Or, the concurrent actuation of both stages (in situations requiring additional gas) may be selected. Or, the sequential actuation of the two combustion chambers (depending on the position of the occupant for example) may be selected to tailor the inflation profile of the airbag.

One challenge is to ensure that the sympathetic ignition of a second chamber is prevented when the first chamber is algorithmically actuated to singularly operate. Or, alternatively, to ensure sequential actuation or operation of both chambers when that option is algorithmically determined. Stated another way, it is an ongoing challenge to prevent premature or sympathetic ignition of the secondary chamber prior to its scheduled deployment. In essence, it has been found that preventing the ignition and combustion products and heat from the primary or first-actuated chamber from entering or communicating with the second chamber is necessary to ensure independent operation of the first and second chambers.

SUMMARY OF THE INVENTION

The aforementioned concerns are resolved by a gas generator that contains a valve assembly actuatable upon selective actuation of a secondary chamber within a dual stage inflator. The valve assembly generally contains a movable divider that substantially seals an enclosure thereby defining a secondary combustion chamber within the gas generator. The movable divider is slidably engaged with an inner wall of the gas generator only once the second combustion chamber is actuated. Accordingly, the invention contains a gas generator comprising: (1) a housing containing a base and a cap fixed to the base; (2) a divider separating the housing into a first combustion chamber and a second combustion chamber, wherein the divider is positioned to prevent sympathetic actuation of the second combustion chamber when the first combustion chamber is actuated; and (3) an inner wall within the housing, the divider slidably engaged with the inner wall upon actuation of the first and second combustion chambers. By press-fitting the divider against the enclosure that partially surrounds the secondary chamber, the secondary chamber is both defined and substantially sealed prior to actuation of the secondary chamber. In essence, the divider substantially prevents thermal and fluid communication between the first and second combustion chambers until the divider prompted by a progressive change in pressure is slidably moved to release the gases within the second combustion chamber.

DETAILED DESCRIPTION

Figure 2:
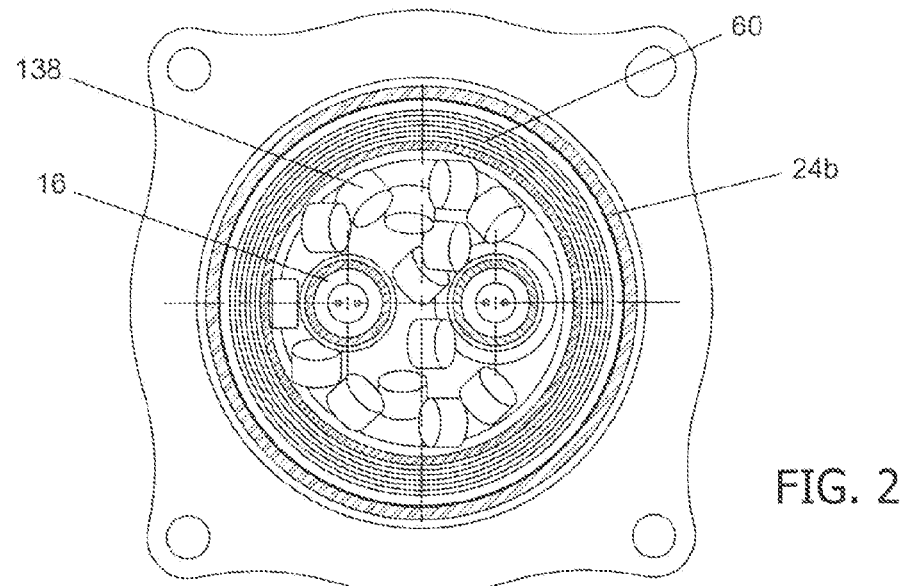
FIG. 2 is a cross-sectional plan view of the embodiment shown in FIG. 1.

Similar reference characters denote similar features consistently throughout the attached drawings.

Figure 1:
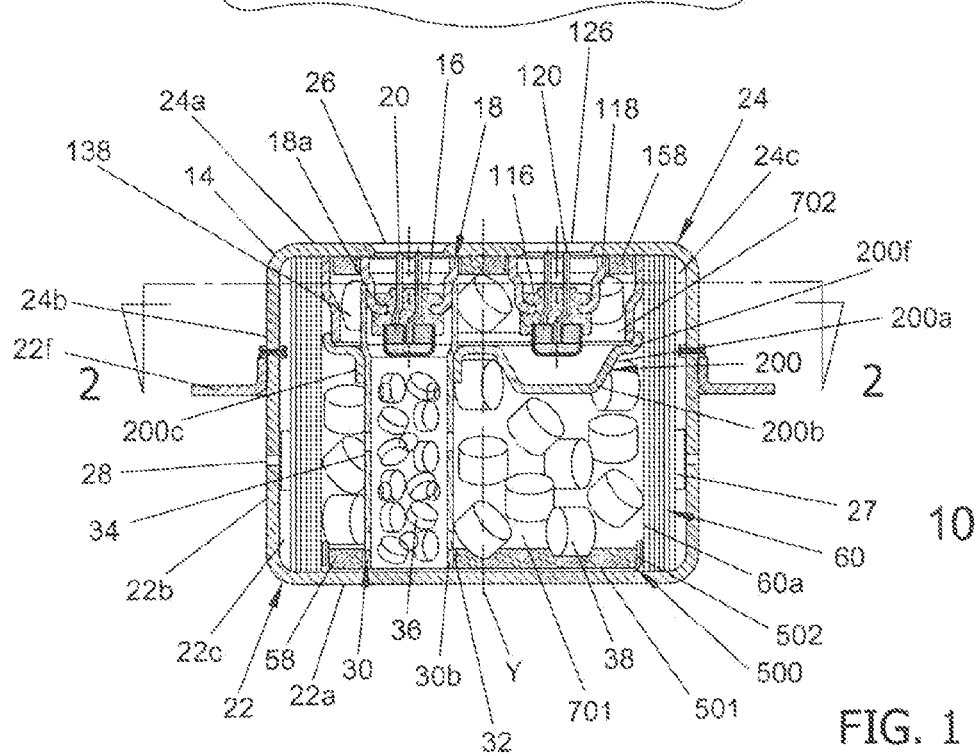
FIG. 1 is a cross-sectional side view of one embodiment of a gas generating system incorporating a movable divider or valve assembly.
Figure 3:
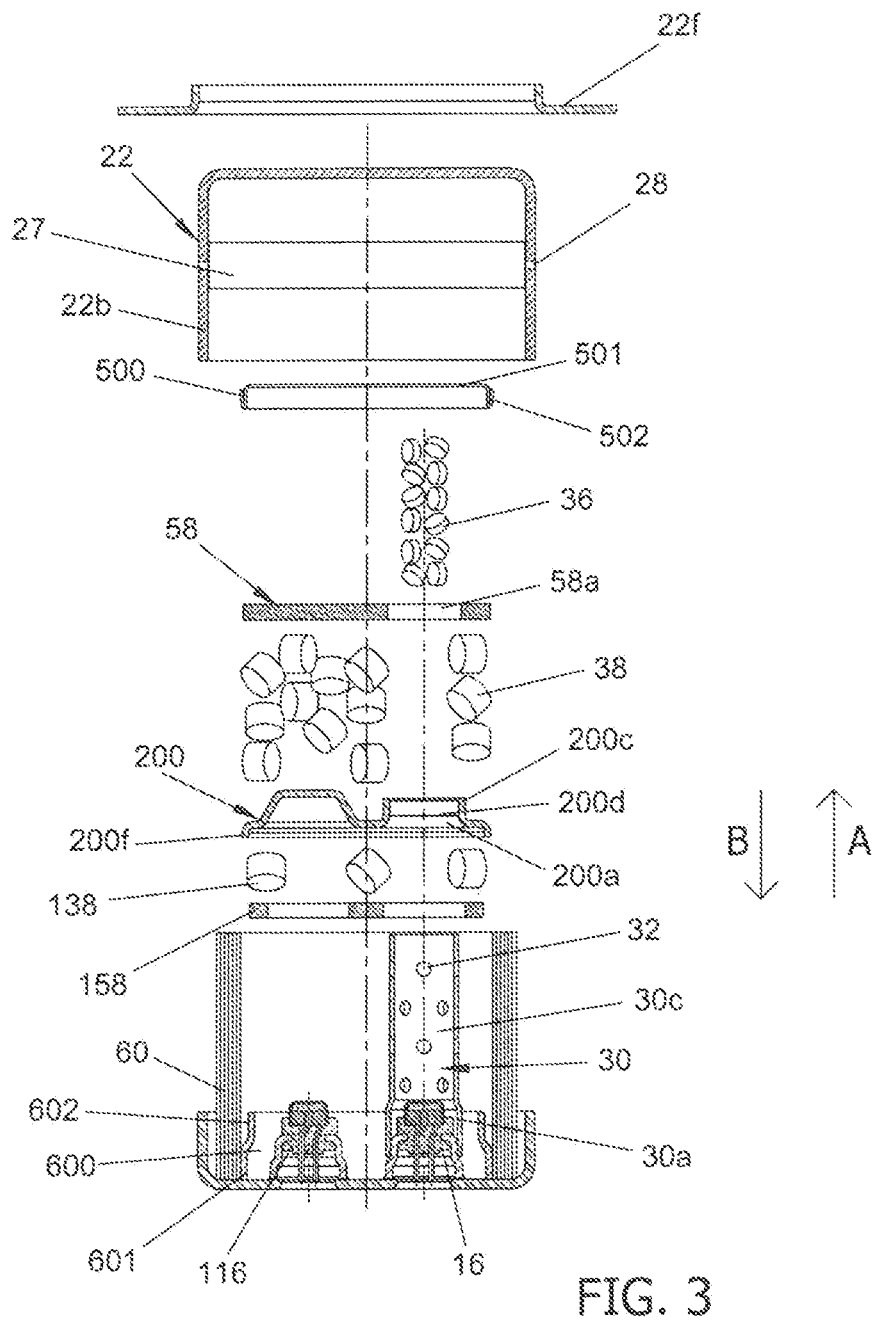
FIG. 3 is an exploded view of the embodiment shown in FIGS. 1 and 2 and illustrating an assembly sequence of the gas generating system.
Figure 4:
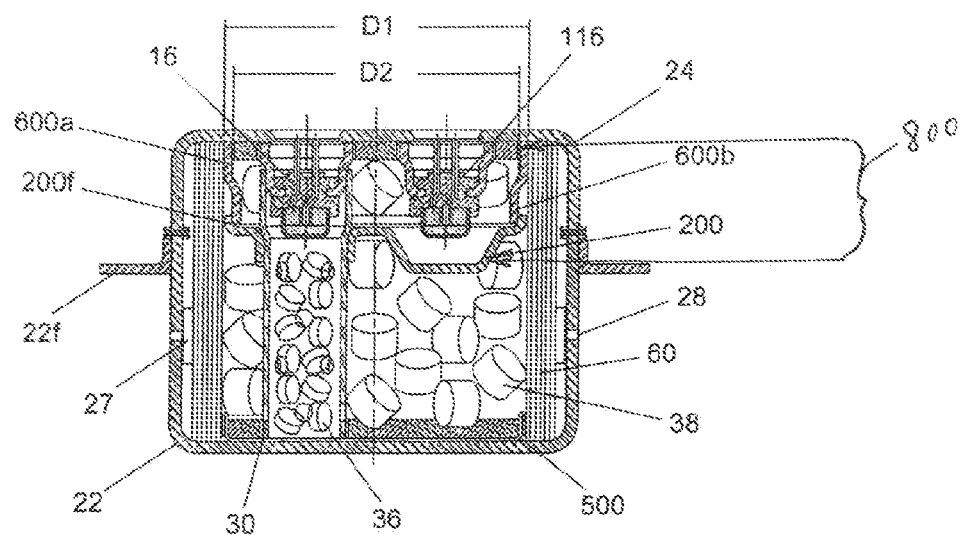
FIG. 4 is the cross-sectional view of FIG. 1 prior to activation of the gas generating system.

FIG. 1 is a cross-sectional side view of one embodiment of a gas generating system 10. FIG. 2 is a cross-sectional plan view of the embodiment shown in FIG. 1. Gas generating system 10 may be utilized to generate gases usable to, for example, inflate a vehicle airbag.

In the embodiments described herein, the gas generating system includes an outer housing 14 containing components of the system positioned therein or attached thereto. First housing portion 22 and second housing portion 24 are also joined so as to prevent separation of the housing portions and maintain the gas-tight seal during operation of the gas generating system. Housing 14 has a central axis Y extending therethrough.

In the embodiment shown in FIGS. 1 and 2, first housing portion 22 is in the form of a cap and second housing portion 24 is in the form of a base which may be secured together to form an outer housing of a driver side airbag inflator. However, the first and second housing portions may have any of a variety of suitable alternative shapes according to the requirements of a particular application. The first and second housing portions may be fabricated (for example, by stamping, casting, forming, molding or some other suitable process) from one or more rigid materials such as carbon steel, stainless steel, a suitable polymer or any other suitable material or materials.

As seen in FIGS. 1 and 2, outer housing 14 is formed by bonding, welding, or otherwise securing together end or edge portions of walls 22b and 24b so as to form a gas-tight seal therebetween.

In the embodiment shown in FIGS. 1 and 2, first housing portion 22 has a cap portion 22a and a wall 22b extending from an edge of the cap portion to define a cavity 22c configured for receiving therein various additional elements of the gas generating system. A plurality of gas discharge apertures 28 are spaced circumferentially along wall 22b to enable fluid communication between cavity 22c and an exterior of the first housing portion.

In the embodiment shown in FIGS. 1 and 2, a flange 22f extends from a wall 22b to aid in mounting of the housing 14 to another structure, for example, a portion of a vehicle. Flange 22f may be formed integrally with first housing portion 22 or second housing portion 24, or the flange 22f may be formed separately from the first or second housing portion (as shown in FIGS. 1 and 2) and secured to the first or second housing portion at any suitable location along the housing portion exterior surface, by welding, adhesive attachment, or any other suitable means.

In the embodiment shown in FIGS. 1 and 2, second housing portion 24 includes a base portion 24a and a wall 24b extending from an edge of the base portion to define a cavity 24c configured for receiving therein a portion of wall 22b of first housing portions and also portions of any additional elements of the gas generating system, as required. In the embodiment shown in FIGS. 1 and 2, a pair of apertures 26 and 126 is provided in base portion 24a to permit access to pair of associated igniters 20 and 120 mounted in (or to) the housing 14 so as to enable fluid communication between the igniters and associated quantities of a gas generant material (or materials) contained within the housing, after activation of the gas generating system. In the embodiment shown, igniter 20 is mounted within a booster tube 30 having an end welded or otherwise suitably secured to an exterior surface of a shoulder 18a formed along a wall of igniter assembly holder 18, so as to form a gas-tight seal between the booster tube end and igniter assembly 16. In one embodiment, tube 30 is also secured to igniter assembly 16 such that the gas-tight seal between the tube and the igniter assembly is maintained during any deformation or expansion of the second housing portion 24 which may occur during operation of the gas generating system.

A retainer 500 may be positioned in intimate thermal contact with first housing portion 22. Retainer 500 has a base portion 501 and a wall 502 extending from a periphery of the base portion. Base portion 501 and wall 502 combine to define a cavity dimensioned to receive a cushion 58 therein. Retainer 500 may be press fit within the filter or simply placed over the first housing portion 22 to hold the propellant in place within the housing 14, during welding of the housing 22. An outer surface of wall 502 may be dimensioned with respect to filter 60 (described below) so as to engage the filter in an interference fit, thereby helping to position and secure the filter within the housing. Intimate thermal contact between the retainer 500 and the first housing portion facilitates heat transfer from an exterior of the housing 14 through the first housing portion 22 and the retainer 500 to an auto-igniting booster material or auto-ignition material positioned in booster tube 30 and in contact with the retainer. The may have an annulus formed therein for passage of the booster tube, thereby retainer 500 ensuring that the auto-ignition booster composition contacts housing portion 22 for optimum efficacy during a thermal event. Retainer 500 may be fabricated (for example, by stamping, casting, forming, molding or some other suitable process) from one or more rigid materials such as carbon steel, stainless steel, a suitable polymer or any other suitable material or materials.

Referring to FIGS. 1-4, an enclosure or casing 600 is welded or otherwise suitably secured to second housing portion base portion 24a, so as to form a gas-tight seal between the casing and the second housing portion. Enclosure 600 is structured to surround or enclose both of apertures 26 and 126. Enclosure 600 has a first end 601 and a second end 602 opposite the first end. Enclosure 600 has a first portion 600a with a first outer dimension D1 and a second portion 600b with a second outer dimension D2 having a value less than D1. In the particular embodiment shown in FIGS. 1 and 2, enclosure is annular in shape, with an outer diameter of first portion 600a having dimension D1 and an outer diameter of second portion 600b having an outer diameter of D2. Dimension D1 is specified (with respect to an inner dimension of a filter 60 (described below)) so as to provide a close or interference fit with the filter. Dimension D2 is specified (with respect to an inner dimension of divider lip 200f) so that enclosure second end 602 engages the divider flange or lip 200f in an interference fit sufficient to maintain a seal and engagement between the divider and the enclosure end prior to activation of the gas generating system. Enclosure 600 may be fabricated (for example, by stamping, casting, forming, molding or some other suitable process) from one or more rigid materials such as carbon steel, stainless steel, a suitable polymer or any other suitable material or materials.

A first igniter assembly 16 is provided for igniting a booster composition 36 (described in greater detail below) positioned in booster tube 30, in response to an activation signal from a vehicle collision sensing system (not shown in FIGS. 1 and 2). In the embodiment shown in FIGS. 1 and 2, igniter assembly 16 includes an igniter holder 18 in which an igniter 20 is secured. Igniter 20 may be secured to holder 18 using any of a number of known methods, for example, crimping, adhesive application, insert molding, or fasteners, or any other method suitable for providing a gas-tight seal between the igniter 20 and holder 18. A rear portion of assembly 16 may be configured to provide an interface mateable with a complementary connector of a wiring harness or other suitable initiator activation signal transmission medium. Holder 18 may be formed from a metal, metal alloy, polymer or any other suitable material using any suitable manufacturing process. Igniter 20 may be formed as known in the art. One exemplary igniter construction is described in U.S. Pat. No. 6,009,809, herein incorporated by reference. In the embodiment shown in FIGS. 1 and 2, holder 18 is secured to an interior surface of second housing portion base portion 24a using any means (for example, molding, welding, or any other suitable) sufficient to provide a gas-tight seal between the holder and the second housing portion 24.

A second igniter assembly 116 is provided for igniting a gas generant material 138 positioned in a secondary combustion chamber 702 formed by dividing an interior of the housing 14 using a divider 200 (described in greater detail below), in response to an activation signal from a vehicle collision sensing system (not shown in FIGS. 1 and 2). In the embodiment shown in FIGS. 1 and 2, igniter assembly 116 includes an igniter holder 118 in which the igniter 120 is secured. Igniter 120 may be secured to holder 118 using any of a number of known methods, for example, crimping, adhesive application, insert molding, or fasteners, or any other method suitable for providing a gas-tight seal between the igniter 120 and holder 118. A rear portion of assembly 116 may be configured to provide an interface mateable with a complementary connector of a wiring harness or other suitable initiator activation signal transmission medium. Holder 118 may be formed from a metal, metal alloy, polymer or any other suitable material using any suitable manufacturing process. Igniter 120 may be formed as known in the art. One exemplary igniter construction is described in U.S. Pat. No. 6,009,809, herein incorporated by reference. In the embodiment shown in FIGS. 1 and 2, holder 118 is secured to an interior surface of second housing portion base portion 24a using any means (for example, molding, welding, or any other suitable) sufficient to provide a gas-tight seal between the holder and the second housing portion 24.

Booster tube 30 has a first end 30a, a second end 30b opposite the first end, and a wall 34 extending between the ends. In the embodiment shown in FIGS. 1 and 2, end 30a is structured for securement to igniter holder 18 so as to form a substantially gas-tight seal at the igniter holder-booster tube interface as previously described, and so as to maintain this securement and seal during operation of the gas generating system.

Tube 30 defines a cavity 30c between ends 30a and 30b structured for receiving therein a booster material 36 and (optionally) an auto-ignition material (not shown). A plurality of gas discharge apertures 32 is spaced circumferentially along wall 34 to enable fluid communication between an interior of the booster tube and an exterior of the tube. Tube end 30b is structured to contact or otherwise engage an interior surface of first housing portion base 22a, in a manner designed to prevent or minimize leakage of gases from the interior of the booster tube through the contact interface between the booster tube end 30b and the first housing portion. Tube end 30b is open to permit an auto-igniting booster material 36 (or auto-ignition material) positioned within the tube to directly contact first housing portion 22. This facilitates heat transfer through the first housing portion to the auto-igniting material in the event of a flame or other heat source impinging on the first housing portion. Heat is transferred through the first housing portion to the auto-igniting material, ignition of which produces ignition of the gas generant material in a manner known in the art.

In the embodiment shown in FIGS. 1 and 2, tube 30 has a generally cylindrical shape. However, tube 30 may have any shape suitable to the requirements of a particular application. Booster tube gas discharge apertures 32 may be covered with rupturable, gas-tight seals or shims (not shown) to seal the apertures. Various known disks, foils, films, or tapes (for example, aluminum or stainless steel shims, foil or tape) may be used to form the seals. The seal material is typically adhered to an exterior surface of the booster tube through the use of an adhesive. Alternatively, other materials or methods may be used to seal apertures 32.

The booster tube 30 may be fabricated (for example, by stamping, casting, forming, molding, extrusion, or some other suitable process) from one or more rigid materials such as carbon steel, stainless steel, a suitable polymer or any other suitable material or materials.

Booster material 36 is positioned within booster tube 30 and a primary gas generating material 38 (also described below) is positioned externally of the booster tube. Booster material 36 is ignitable via igniter 20 (and an associated auto-ignition material, if needed) in a conventional manner to ignite and enhance the burn characteristics of gas generant material 38. In one particular embodiment, booster material 36 is a known auto-igniting booster (or "AIB") material positioned in tube 30 so as to enable thermal communication with first housing portion base portion 22a before activation of the gas generating system, thereby enabling heat transfer from an exterior of the housing to the auto-igniting booster material using the housing as a heat transfer medium. The known AIB composition 36 may for example be manufactured or formed as described in U.S. Pat. No. 8,273,199, the teachings of which are herein incorporated by reference in their entirety. In a manner known in the art, the auto-igniting booster material fulfills the functions of both a conventional booster material and a conventional auto-ignition material, enabling ignition of the gas generant material in cases where the housing 14 is exposed to an elevated external temperature (prior to actuation during a crash event) resulting from, for example, a flame. This obviates the need for a separate auto-ignition material.

In an embodiment not utilizing an auto-igniting booster material, a quantity of a separate, known auto-ignition material (not shown) may be positioned within the gas generating system 10 such that combustion of the auto-ignition material will produce ignition of the booster material, in a manner known in the art. In the embodiment shown in FIGS. 1 and 2, auto-ignition material may be positioned along with booster material 36 within booster tube 30 so that the auto-ignition material is in direct contact with the booster material. In addition, at least a portion of any conventional auto-ignition material or auto-igniting booster material is positioned within the system so as to provide direct contact with housing 14, such that heat transmitted to the housing exterior due to an elevated temperature event (for example, a flame impinging upon the housing) will be transmitted via the housing to the auto-ignition material or auto-igniting booster material. This positioning of the auto-ignition and auto-igniting booster materials helps to ensure prompt ignition of the gas generant material upon occurrence of the elevated temperature event, in a manner known in the art. In the embodiment shown in FIGS. 1 and 2, at least a portion the auto-ignition material (or auto-igniting booster material) is positioned within booster tube 30 and in contact with first housing portion 22.

Gas generant material 38 may be any suitable gas generant composition known in the art. Exemplary gas generant compositions include, but are not limited to, those described in U.S. Pat. Nos. 5,035,757, 5,872,329, 5,756,929, and 5,386,775, the teachings of which are herein incorporated by reference in their entirety. In the embodiment shown, gas generant 38 is provided in tablet form, but may be provided in other forms.

Gas generant material 138 may be any suitable gas generant composition known in the art. Exemplary gas generant compositions include, but are not limited to, those described in U.S. Pat. Nos. 5,035,757, 5,872,329, 5,756,929, and 5,386,775. In the embodiment shown, gas generant 138 is provided in tablet form, but may be provided in other forms. Gas generant 138 may be the same material as generant 38 or generant 138 may be formed from a material different from that of material 38.

Referring again to FIGS. 1 and 2, a divider 200 is positioned within first housing portion cavity 22c to separate the interior of housing 14 into a first or primary combustion chamber 701 housing gas generant 38 and a secondary combustion chamber 702 housing gas generant 138. In the embodiment shown in FIGS. 1 and 2, divider 200 has a base portion 200a, a recess or depression 200b formed in the base portion and extending in a first direction A from the base portion, and a wall 200c extending in the first direction A from the base portion to define an opening 200d sized to engage an outer surface of booster tube wall 34 in a close sliding fit, such that wall 200c is slidable along the exterior surface of the booster tube wall 34 responsive to differences in pressure between the first chamber 701 and the second chamber 702. A lip or flange 200f is formed along a peripheral edge of the divider. In the embodiment shown, lip 200f extends from base portion 200a in a second direction B opposite the first direction A. An outer or overall dimension of lip 200f is specified (with respect to an inner dimension of the filter 60) such that lip 200f engages filter 60 (described below) in a close sliding fit designed to minimize leakage of generated gases between the divider 200 and the filter 60, thereby substantially sealing the filter and divider interface. Upon actuation of secondary chamber 702, the divider 200 is slidably engaged with an inner wall 60a of filter 60, thereby facilitating fluid and thermal communication between primary combustion chamber 701 and secondary combustion chamber 702. An interior surface of wall 200c is dimensioned (with respect to an exterior surface or wall 34 of booster tube 30) so that the wall 200c of divider 200 slidably engages the booster tube 30 in a close sliding fit, thereby substantially sealing the booster/divider interface, and thereby minimizing leakage of generated gases between the divider 200 and the booster tube 30. The divider 200 may be fabricated (for example, by stamping, casting, forming, molding or some other suitable process) from one or more rigid materials such as carbon steel, stainless steel, a suitable polymer or any other suitable material or materials.

A filter 60 is positioned within housing 14 for filtering particulates from gases generated by combustion of gas generants 38 and 138. In general, filter 60 is positioned between gas generants 38 and 138 and gas-exit apertures 28 formed along first housing portion 22 so that gases generated by combustion of the gas generant will flow through the filter prior to exiting the housing 14. In the embodiment shown in FIGS. 1 and 2, filter 60 is an annular filter. However, the filter may have any suitable shape. The filter 60 may be formed from any of a variety of materials (for example, a carbon fiber or metallic mesh or perforated sheet, or a compressed knitted metal wire) known in the art for filtering gas generant combustion products. Suitable metallic mesh is readily obtainable from suppliers such as Wayne Wire, Inc., of Kalkaska, Mich. Suitable compressed knitted metal wire is commercially available from vendors such as Metex Corp. of Edison, N.J. However, the filter may have any suitable composition.

Referring again to FIGS. 1 and 2, a first cushion or pad 58 is positioned within cavity 22c between gas generant material 38 and retainer 500. Pad 58 aids in holding the gas generant material 38 in place and/or in cushioning the gas generant against vibration and impact. In the embodiment shown in FIGS. 1 and 2, pad 58 has an opening 58a through which booster tube 30 extends. Pad 58 may be formed from, for example, a ceramic fiber material or any other suitable material. Cushion 58, divider 200, filter 60, first housing portion 22 and the portion of booster tube 30 extending through the divider 200 combine to define combustion chamber 701 for the gas generant material 38.

Referring again to FIGS. 1 and 2, a second cushion or pad 158 is positioned within chamber 702 between gas generant material 138 and second housing portion 24. Pad 158 aids in holding the gas generant material 138 in place and/or in cushioning the gas generant against vibration and impact. In the embodiment shown in FIGS. 1 and 2, pad 158 has a pair of openings through which igniter holders 18 and 118 extend. Pad 158 may be formed from, for example, a ceramic fiber material or any other suitable material. Cushion 158, enclosure 600, second housing portion 24, booster tube 30 and divider 200 combine to define a secondary combustion chamber 702 for the gas generant material 138.

First housing portion gas discharge apertures 28 may be covered with rupturable, gas-tight seals or shims to seal the apertures. Various known disks, foils, films, or tapes (for example, aluminum or stainless steel shims, foil or tape) may be used to form the seals. The seal material is typically adhered to an interior surface of the first housing portion through the use of an adhesive. Alternatively, other materials or methods may be used to seal apertures 28. In the embodiment shown in FIGS. 1 and 2, a continuous strip of seal tape 27 is applied to an interior surface of housing first portion wall 22b prior to system assembly, thereby forming a first housing portion sub-assembly.

During operation of the gas generating system 10 to activate only the first chamber 701, igniter 20 activates in a manner known in the art upon receiving a signal from a vehicle crash sensing system or other activation signal source. Activation of igniter 20 results in combustion of booster material 36. Flame and hot gases from combustion of the booster material then exit booster tube apertures 32 to ignite gas generant material 38. Gases from the combustion of gas generant 38 flow through filter 60. Pressure from the generated gases also acts to press divider lip 200f against enclosure second end 602, thereby enhancing the seal between the divider and the enclosure. Thus, the divider 200 prevents the gas generant 138 in chamber 702 from igniting and combusting due to combustion of generant 38 in chamber 701. Stated another way, the divider 200 prevents thermal and fluid communication between the actuated chamber 701 and the non-actuated or pre-actuated chamber 702. The gases then pass through filter 60 and continue to flow between filter 60 and first and second housing portion walls 22b and 24b. Elevated pressures cause shims 27 to burst, releasing the generated gases through gas exit openings 28 and into a gas-actuatable element (not shown) operatively coupled to the gas generating system. As the combustion gases pass along the surface area represented by base portion 200a and recess portion 200b of the divider 200, and through filter 60 to exit apertures 28, the gases are cooled and flames are suppressed. Thus, the gas flow path extending across the area of the divider 200 within chamber 701, through the filter 60, and out of housing gas exit apertures 28 provides a structure or system for expansion and cooling of the generated gases thereby suppressing the generated flame front, prior to their release into, for example, an inflatable element of a vehicle occupant protection system.

Figure 5:
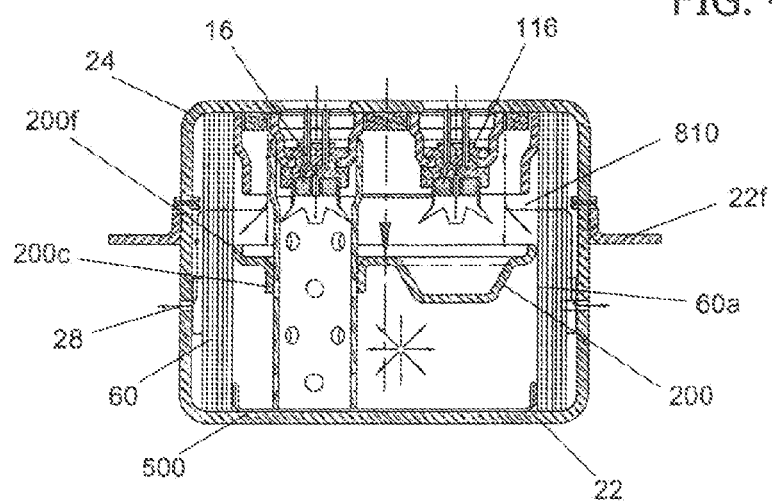
FIG. 5 is the cross-sectional view of FIG. 1 in one operational mode after activation of the gas generating system.

In an operational mode where gases from both combustion chambers to be employed in actuating an associated gas-actuatable device, igniters 20 and 120 may be activated in sequence or simultaneously, depending on the requirements of a particular application. Referring to FIG. 5, during operation of the gas generating system 10 to activate both the first chamber 701 and the second chamber 702, igniter 20 activates in a manner known in the art upon receiving a signal from a vehicle crash sensing system or other activation signal source. Activation of igniter 20 results in combustion of booster material 36. Flame and hot gases from combustion of the booster material then exit booster tube apertures 32 to ignite gas generant material 38. Gases from the combustion of gas generant 38 flow through filter 60. The gases then pass through filter 60 and continue to flow between filter 60 and first and second housing portion walls 22b and 24b. Elevated pressures cause shims 27 to burst, releasing the generated gases through gas exit openings 28 and into a gas-actuatable element (not shown) operatively coupled to the gas generating system. As the combustion gases pass along the surface area represented by base portion 200a and recess portion 200b of the divider 200, and through filter 60 to exit apertures 28, the gases are cooled and flames are suppressed. Thus, the gas flow path extending across the area of the divider 200 within chamber 701, through the filter 60, and out of housing gas exit apertures 28 provides a structure or system for expansion and cooling of the generated gases thereby suppressing the generated flame front, prior to their release into, for example, an inflatable element of a vehicle occupant protection system.

As gases generated in chamber 701 flow out of the chamber and through openings 28, pressure in chamber 701 drops until, at some point in time after combustion of generant 138 has commenced, the pressure in chamber 702 exceeds the pressure in chamber 701 to a degree where divider 200 is forced to detach from enclosure 600. Stated another way, whether the chambers 701 and 702 are operated sequentially or simultaneously, a relatively greater pressure created in chamber 702, as compared to chamber 701, results in an opening of chamber 702 thereby shunting gases generated therein to filter 60, as shown in FIG. 5. Gases then proceed to flow out of both chamber 701 and chamber 702 through the filter and out of housing 14. Divider 200 slidably engages the interior surface 60a of filter 60 and the outer wall 34 of booster tube 30 in the direction indicated by arrow A, until a pressure equilibrium is reached between the chambers 701 and 702.

The volume of each of chambers 701 and 702 in relation to the other chamber may be controlled by adjusting the position of the divider along the filter 60 and booster tube 30 during system assembly. In one embodiment, the position of the divider is adjusted utilizing an enclosure having a desired length between enclosure ends 601 and 602. In another embodiment, an enclosure having a standard length is used, and a spacer (not shown) having a suitable additional length is stacked onto the enclosure or otherwise positioned between the divider and the enclosure to increase the size of chamber 702 relative to chamber 701, thereby effectively increasing the desired length between enclosure ends 601 and 602. Using one of these methods, the volume ratio of chamber 701 to chamber 702 may be relatively easily changed. In a particular embodiment, the ratio of the volume of the main chamber 701 to the secondary chamber 702 is 90/10. In another particular embodiment, the ratio of the volume of the main chamber 701 to the secondary chamber 702 is 60/40. In another particular embodiment, the ratio of the volume of the main chamber 701 to the secondary chamber 702 is 50/50. It will be appreciated that other volumetric relationships may be determined based on desired design criteria.

The present invention may therefore be more generally characterized as a gas generator valve assembly 800 that divides the housing 14 into a primary combustion chamber 701 and a secondary combustion chamber 702. The valve assembly 800 contains the enclosure 600 and the movable divider 200 as described above, wherein the divider 200 is seated against the enclosure 600 to provide substantial sealing of the chamber 702 (defined by the enclosure 600 and the divider 200 press fit against the enclosure 600). Upon actuation of chamber 702, by activation of igniter 120 and combustion of gas generant 138, the divider 200 slidably engages an inner wall 60a within the housing responsive to a relatively greater pressure in chamber 702 than in 701. Stated another way, the movable divider 200 slidably engages the booster tube wall 34 and an inner wall 60a of filter 60 in the direction A as indicated by the arrow in FIG. 3. As stated, in one embodiment, the inner wall 60a is in fact the inner wall of filter 60. However, it will be appreciated that the inner wall 60a could also be an inner wall of the housing 14, should a filter 60 not be needed for example. Once the divider 200 begins to move, the seal formed between enclosure 600 and divider 200 at the junction of lip 200f and dimension 602 is breached, and gas then is able to flow through the resultant opening 810. See FIG. 5. Accordingly, the valve assembly is actuatable only upon selective operation of secondary chamber 702, dependent on algorithmic direction as described above. All other features of the gas generator 10 are as stated above. In sum, the valve assembly 800 may be characterized as: (1) a movable divider 200 separating the housing 14 into a first combustion chamber 701 and a second combustion chamber 702, the second combustion chamber 702 substantially sealed from the first combustion chamber 701 prior to actuation of the second combustion chamber 702; and (2) an enclosure 600 seated or fixed within the housing 14 (as described above) and at least partially enclosing the second combustion chamber (see FIG. 1), wherein the movable divider 200 is seated against the enclosure 600 and substantially seals the second combustion chamber 702 prior to actuation of the second combustion chamber 702.

Figure 6:
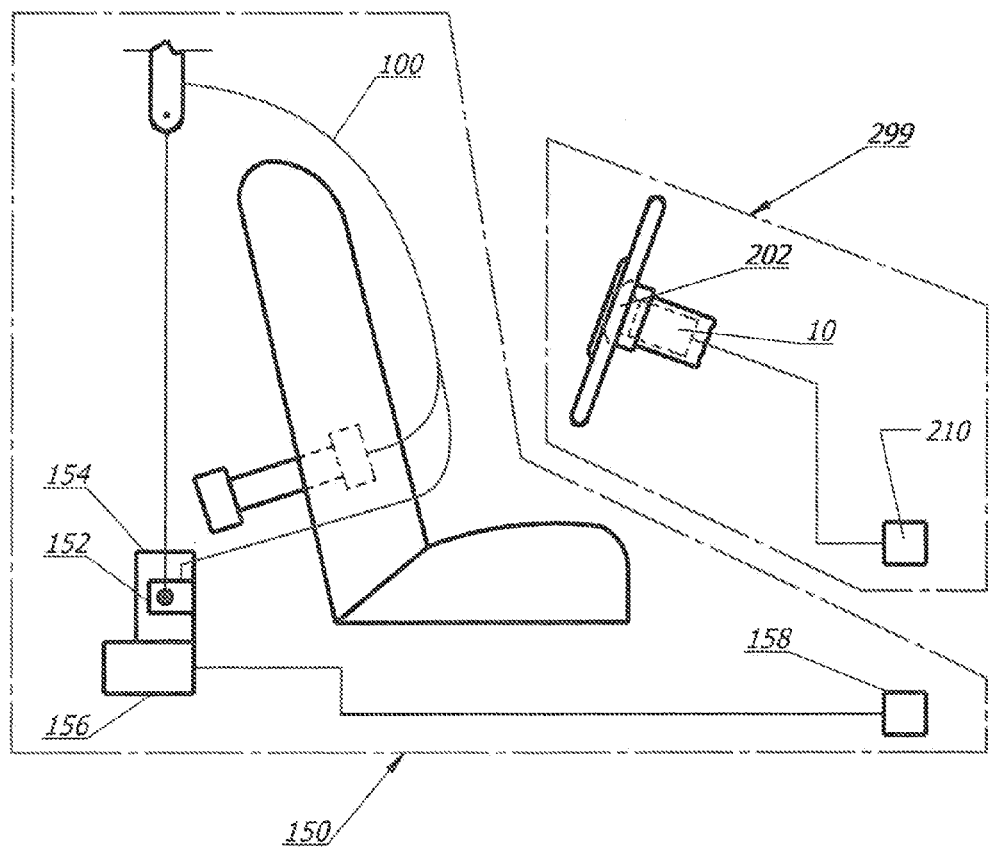
FIG. 6 is a view of a vehicle occupant protection system incorporating a gas generating system in accordance with an embodiment of the present invention.

Referring now to FIG. 6, an embodiment 10 of the gas generating system described above may be incorporated into an airbag system 299. Airbag system 299 includes at least one airbag 202 and a gas generating system 10 in accordance with embodiments of the present invention, coupled to airbag 202 so as to enable fluid communication with an interior of the airbag upon activation of the gas generating system. Airbag system 299 may also include (or be in communication with) a crash event sensor 210. Crash event sensor 210 includes a known crash sensor algorithm that prompts actuation of airbag system 299 via, for example, activation of gas generating system 10 in the event of a collision.

Referring again to FIG. 6, airbag system 299 may also be incorporated into a broader, more comprehensive vehicle occupant protection system 180 including additional elements such as a safety belt assembly 150. FIG. 6 shows a schematic diagram of one exemplary embodiment of such a protection system. Safety belt assembly 150 includes a safety belt housing 152 and a safety belt 100 extending from housing 152. A safety belt retractor mechanism 154 (for example, a spring-loaded mechanism) may be coupled to an end portion of the belt. In addition, a known safety belt pretensioner 156 may be coupled to belt retractor mechanism 154 to actuate the retractor mechanism in the event of a collision. Typical seat belt retractor mechanisms which may be used in conjunction with the safety belt embodiments of the present invention are described in U.S. Pat. Nos. 5,743,480, 5,553,803, 5,667,161, 5,451,008, 4,558,832 and 4,597,546, incorporated herein by reference. Illustrative examples of typical pretensioners with which the safety belt embodiments of the present invention may be combined are described in U.S. Pat. Nos. 6,505,790 and 6,419,177, incorporated herein by reference.

Safety belt assembly 150 may also include (or be in communication with) a crash event sensor 158 (for example, an inertia sensor or an accelerometer) including a known crash sensor algorithm that prompts actuation of belt pretensioner 156 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

It should be understood that the preceding is merely a detailed description of various embodiments of this invention and that numerous changes to the disclosed embodiments can be made in accordance with the disclosure herein without departing from the spirit or scope of the invention. The preceding description, therefore, is not meant to limit the scope of the invention.

What is claimed is:

1. A gas generator comprising:
a housing comprising a base and a cap fixed to said base;
a divider separating said housing into a first combustion chamber and a second combustion chamber, wherein said divider prevents sympathetic actuation of said second combustion chamber when said first combustion chamber is actuated, said divider including a peripheral lip extending therearound, the peripheral lip having an outer peripheral surface; and
a filter defining an inner wall within said housing, said outer peripheral surface of the peripheral lip of the divider being slidably engaged with said inner wall upon actuation of said first and second combustion chambers.

2. The gas generator of claim 1 wherein said inner wall defines a closed interior boundary and wherein the peripheral lip of the divider extends in a close fit along the peripheral boundary.

3. The gas generator of claim 2, wherein the filter extends between the base and the cap of the housing.

4. The gas generator of claim 3, wherein the peripheral lip defines a radius extending in a direction of sliding of the divider.

5. The gas generator of claim 4, wherein the inner wall of the filter defines an extruded shape.

6. The gas generator of claim 5, wherein the extruded shape is a cylindrical shape.

7. The gas generator of claim 1 further comprising a booster tube having an outer wall, said booster tube extending from said base to said cap within said first and second combustion chambers, and said divider slidably engaged with said outer wall upon actuation of said second combustion chamber.

8. The gas generator of claim 1 further comprising:
an igniter enclosure seated within said housing and at least partially enclosing said second combustion chamber;
a first igniter assembly seated within said base for actuating said first combustion chamber; and
a second igniter assembly seated within said base for actuating said second combustion chamber,
wherein said divider seated against said igniter enclosure seals said second combustion chamber prior to actuation of said second combustion chamber.

9. The gas generator of claim 8 wherein upon actuation of said first and second combustion chambers, said divider panel slidably engages said inner wall to provide fluid communication between said first and second combustion chambers.

10. The gas generator of claim 8 wherein said divider contains a peripheral flange that seats against said igniter enclosure thereby substantially sealing said second combustion chamber.

11. A vehicle occupant protection system containing the gas generator of claim 1.

12. A gas generator comprising:
a housing comprising a base and a cap fixed to said base;
a movable divider separating said housing into a first combustion chamber and a second combustion chamber, said movable divider including a peripheral lip, the peripheral lip having an outer peripheral surface;
an enclosure seated within said housing and at least partially enclosing said second combustion chamber,
wherein said movable divider is seated against said enclosure and substantially seals said second combustion chamber prior to actuation of said second combustion chamber; and
wherein a filter defines an inner wall within said housing, wherein the outer peripheral surface of the peripheral lip of the movable divider is slidably engaged with said inner wall upon actuation of said first and second combustion chambers.

13. The gas generator of claim 12 wherein the inner wall defines a closed peripheral boundary and wherein the peripheral lip of the movable divider extends in a close fit along the peripheral boundary.

14. The gas generator of claim 13 wherein the filter extends between the base and the cap of the housing.

15. The gas generator of claim 12 further comprising a booster tube within said housing, said movable divider containing an annular inner wall slidably engaged with an outer wall of said booster tube upon actuation of said first and second combustion chambers.

16. The gas generator of claim 12 wherein said movable divider contains a peripheral flange that seats against said enclosure thereby sealing said second combustion chamber.

17. A gas generator comprising:
a housing comprising a base and a cap fixed to said base;
a valve assembly separating said housing into a first combustion chamber and a second combustion chamber, said second combustion chamber operably independent of said second combustion chamber, wherein said valve assembly prevents fluid and thermodynamic communication between said first and second combustion chambers prior to actuation of said second combustion chamber, and wherein said valve assembly includes a movable divider separating said housing into said first combustion chamber and said second combustion chamber, the movable divider including a peripheral lip, the peripheral lip having an outer peripheral surface; and
a filter defining an inner wall within said housing, wherein the outer peripheral surface of the peripheral lip of the movable divider is slidably engaged with said inner wall upon actuation of said first and second combustion chambers.

18. A vehicle occupant protection system containing the gas generator of claim 17.

19. The gas generator of claim 17 wherein said valve assembly comprises:
an enclosure seated within said housing and at least partially enclosing said second combustion chamber,
wherein said movable divider is seated against said enclosure and substantially seals said second combustion chamber prior to actuation of said second combustion chamber.

20. A vehicle occupant protection system containing the gas generator of claim 19.

* * * * *